(12) United States Patent
Huang et al.

(10) Patent No.: US 12,547,051 B2
(45) Date of Patent: Feb. 10, 2026

(54) CAMERA MODULE AND ELECTRONIC DEVICE

(71) Applicant: Acer Incorporated, New Taipei (TW)

(72) Inventors: Yu-Chin Huang, New Taipei (TW);
Cheng-Mao Chang, New Taipei (TW);
Li-Hua Hu, New Taipei (TW);
Pao-Min Huang, New Taipei (TW);
Chien-Yuan Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 247 days.

(21) Appl. No.: 18/448,959

(22) Filed: Aug. 13, 2023

(65) Prior Publication Data

US 2024/0192576 A1    Jun. 13, 2024

(30) Foreign Application Priority Data

Dec. 8, 2022   (TW) ................. 111213537

(51) Int. Cl.
*G03B 11/04*   (2021.01)
*G06F 1/16*   (2006.01)

(52) U.S. Cl.
CPC ............ *G03B 11/04* (2013.01); *G06F 1/1624* (2013.01); *G06F 1/1686* (2013.01)

(58) Field of Classification Search
CPC ................. G06F 1/1686; G03B 11/041–043
See application file for complete search history.

(56) References Cited

U.S. PATENT DOCUMENTS

| | | | | |
|---|---|---|---|---|
| 6,447,175 | B1 * | 9/2002 | Ogawa | G03B 9/00 |
| | | | | 428/480 |
| 8,896,754 | B2 * | 11/2014 | Mundt | H04N 23/50 |
| | | | | 348/207.99 |
| 11,079,657 | B1 * | 8/2021 | Chang | G03B 11/045 |
| 11,422,433 | B2 * | 8/2022 | Abe | G03B 9/36 |
| 11,579,513 | B2 * | 2/2023 | Niu | G03B 11/043 |
| 2019/0369661 | A1 * | 12/2019 | Kinoshita | G06F 1/1605 |
| 2020/0393739 | A1 * | 12/2020 | Kinoshita | G03B 11/04 |

* cited by examiner

*Primary Examiner* — Leon W Rhodes, Jr.
(74) *Attorney, Agent, or Firm* — JCIPRNET

(57) ABSTRACT

A camera module suited for assembled in a casing is provided. The camera module includes a camera and a switch cover. The camera is disposed in the casing and aligned with a camera hole of the casing. The switch cover is slidably disposed in the casing, wherein the switch cover includes a sliding member and a shielding member secured to the sliding member, and a thickness of the shielding member is less than a thickness of the sliding member. The camera hole is seated on a sliding path of the shielding member. The shielding member is suited for blocking between the camera and the camera hole or moving out between the camera and the camera hole. An electronic device is also provided.

8 Claims, 5 Drawing Sheets

CAMERA MODULE AND ELECTRONIC DEVICE

CROSS-REFERENCE TO RELATED APPLICATION

This application claims the priority benefit of Taiwan application no. 111213537, filed on Dec. 8, 2022. The entirety of the above-mentioned patent application is hereby incorporated by reference herein and made a part of this specification.

TECHNICAL FIELD

The disclosure relates to a camera module and an electronic device.

BACKGROUND

In order to send, receive and process information anytime and anywhere, smartphones, tablet computers and notebook computers have become indispensable tools for modern people. Generally speaking, most smartphones, tablet computers, and notebook computers are equipped with a camera module, and there is a camera hole corresponding to the camera module in the casing, so that the camera module can capture images from the outside world through the camera hole of the casing. In order to strengthen information security and protect personal privacy, a switch cover was proposed to cover the camera hole. If the switch cover adopts an automatic switching mechanism, those who want to steal private images can still remotely hack into smart phones, tablet computers, and notebook computers to control the switch cover and obtain private images through the camera module.

In addition, in order to improve portability and maximize the display area, thinning and narrow bezel are the mainstream design of current smartphones, tablets, and notebooks, but common switch covers have the disadvantages of too thick and too wide, which hinder the development of thinning and narrow bezel.

SUMMARY

The disclosure proposes a camera module and an electronic device with good information security protection.

The disclosure proposes a camera module suited for assembled in a casing. The camera module includes a camera and a switch cover. The camera is arranged in the casing and aligned with the camera hole of the casing. The switch cover is slidably arranged in the casing, wherein the switch cover includes a sliding member and a shielding member secured to the sliding member, and a thickness of the shielding member is less than a thickness of the sliding member. The camera hole is seated on a sliding path of the shielding member. The shielding member is suited for blocking between the camera and the camera hole or moving out between the camera and the camera hole.

The disclosure proposes an electronic device including a casing, a camera and a switch cover. The casing had a display area, a frame area surrounding the display area, and a camera hole located in the frame area. The camera is disposed in the casing corresponding to the frame area, and aligned with the camera hole. The switch cover is slidably arranged in the casing corresponding to the frame area, wherein the switch cover includes a sliding member and a shielding member secured to the sliding member, and a thickness of the shielding member is less than a thickness of the sliding member. The camera hole is seated on a sliding path of the shielding member. The shielding member is suited for blocking between the camera and the camera hole or moving out between the camera and the camera hole.

Based on the above, in the camera module and electronic device of the present disclosure, the switch cover adopts a manual switching mechanism. Accordingly, even if a person who deliberately steals private images invades the camera module and electronic device at the remote end, the person cannot control the switch cover, and the private image cannot be obtained through the camera covered by the switch cover. Therefore, the camera module and electronic device of the present disclosure have good information security protection.

DESCRIPTION OF THE EMBODIMENTS

Figure 1:
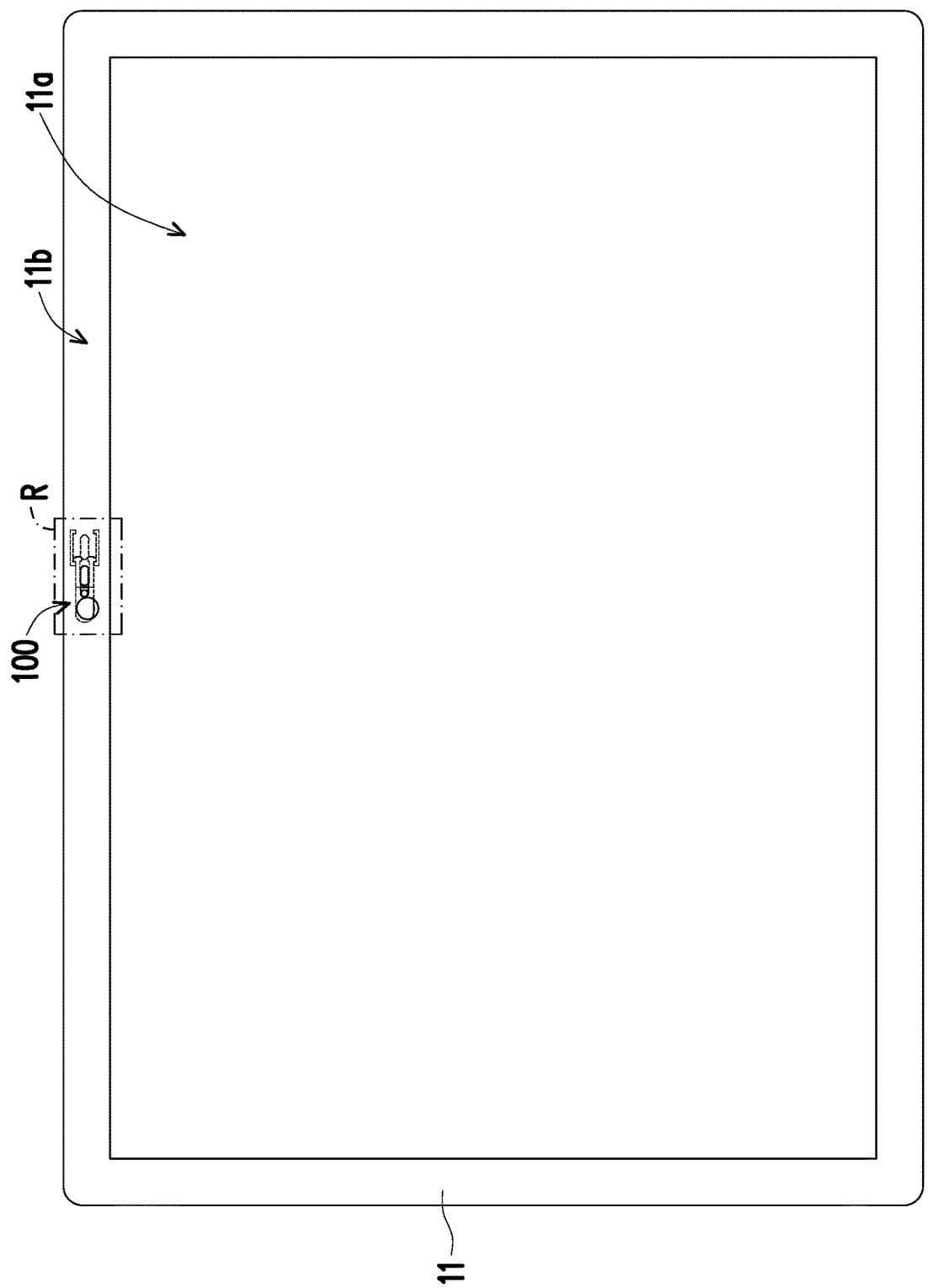
FIG. 1 is a schematic diagram of an electronic device according to an embodiment of the present disclosure.
Figure 2A:
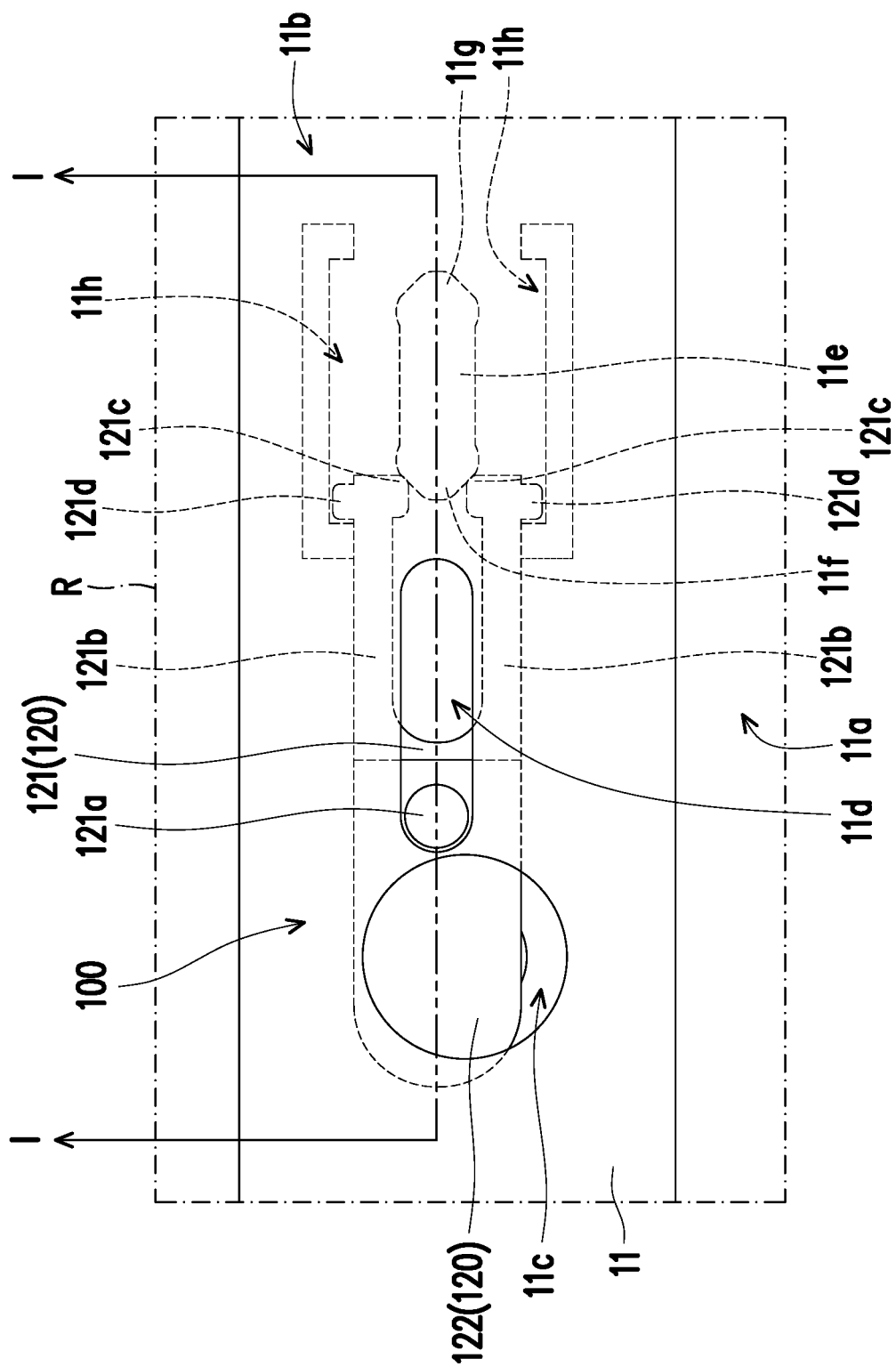
FIG. 2A is a partially enlarged schematic diagram of area R in FIG. 1.
Figure 2B:
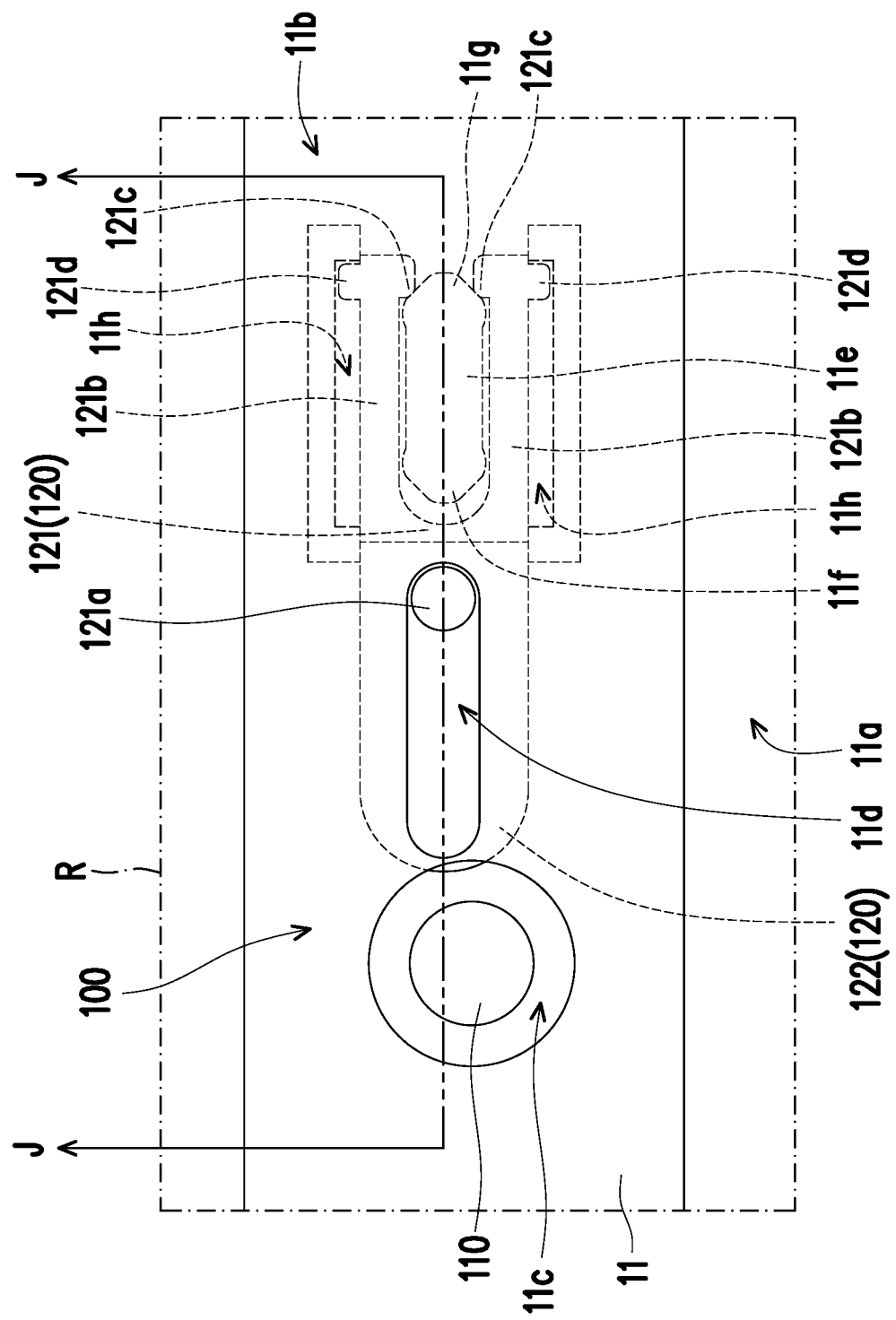
FIG. 2B is a schematic diagram of switching to another state in FIG. 2A.

FIG. 1 is a schematic diagram of an electronic device according to an embodiment of the present disclosure. FIG. 2A is a partially enlarged schematic diagram of area R in FIG. 1. FIG. 2B is a schematic diagram of switching to another state in FIG. 2A. Please refer to FIG. 1 and FIG. 2A, in this embodiment, the electronic device 10 may be a smartphone, a tablet computer and a notebook computer, and include a casing 11 and a camera module 100. The casing 11 has a display area 11a, a frame area 11b surrounding the display area 11a, and a camera hole 11c located in the frame area 11b, wherein the camera module 100 is installed in the casing 11 and located in the frame area 11b.

Figure 3A:
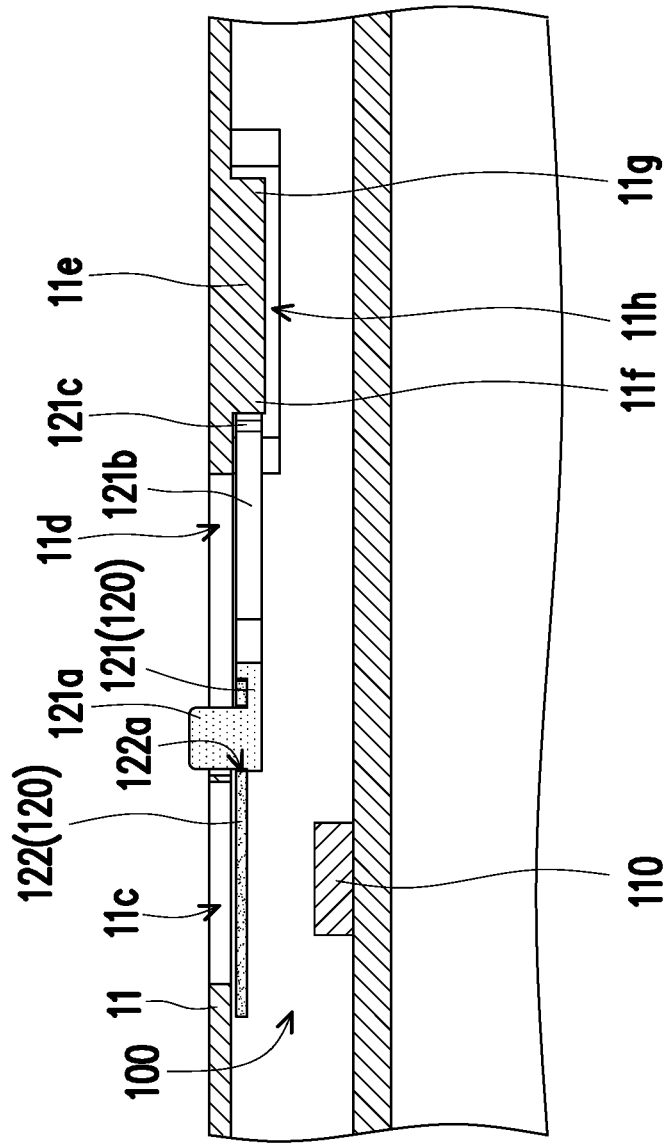
FIG. 3A is a schematic cross-sectional view of FIG. 2A along the section line I-I.
Figure 3B:
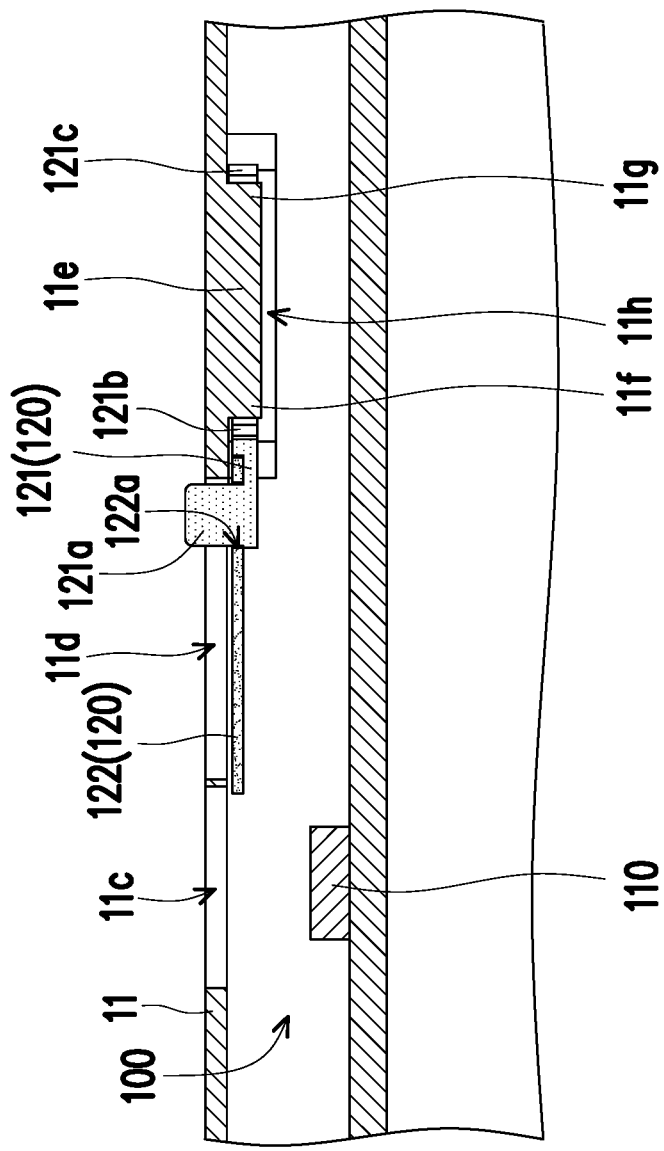
FIG. 3B is a schematic cross-sectional view of FIG. 2B along the section line J-J.

FIG. 3A is a schematic cross-sectional view of FIG. 2A along the section line I-I. FIG. 3B is a schematic cross-sectional view of FIG. 2B along the section line JJ. Please refer to FIG. 1, FIG. 2A and FIG. 3A, the camera module 100 includes a camera 110 and a switch cover 120, wherein the camera 110 is disposed in the casing 11 corresponding to the frame area 11b, and is aligned with the camera hole 11c. In addition, the switch cover 120 is slidably disposed in the casing 11 corresponding to the frame area 11b, and is suited for blocking between the camera 110 and the camera hole 11c. The switch cover 120 adopts a manual switching mechanism. When the switch cover 120 blocks the path of external light to the camera 110, the person who deliberately steals private images will not be able to remotely control the switch cover 120 by invading the electronic device 10, and will also not be able to obtain private images through the camera module 100, so it has good information security protection.

As shown in FIG. 2B and FIG. 3B, once there is a need to capture images, the user can manually slide the switch cover 120 to move the switch cover 120 out between the camera 110 and the camera hole 11c, so that the path through that the external light passes to the camera 110 is restored. As shown in FIG. 2A and FIG. 3A, once there is no need to capture images, the user can manually slide the switch cover 120 again to move the switch cover 120 back between the camera 110 and the camera hole 11c, and block the path through which external light passes to the camera 110.

As shown in FIG. 1, FIG. 2A and FIG. 3A, the switch cover 120 includes a sliding member 121 and a shielding member 122 secured to the sliding member 121, and the thickness of the shielding member 122 is less than that of the sliding member 121. For example, the sliding member 121 may be a plastic member, and the shielding member 122 may be attached to the sliding member 121, such as a polyester film attached to the sliding member 121 through glue or adhesive tape. The thickness of the shielding member 122 is approximately between 0.3 mm and 0.5 mm, which is beneficial to maintain or reduce the thickness of the electronic device 10 to meet the thinning design requirement. In addition, the switch cover 120 composed of the plastic member and the polyester film attached on the plastic member has a narrow width, which is conducive to further reducing the width of the frame area 11b to meet the design requirement of narrow bezel.

As shown in FIG. 2A and FIG. 2B, the shielding member 122 has low light transmittance or is opaque, and the camera hole 11 c is located on the sliding path of the shielding member 122. As shown in FIG. 2A and FIG. 3A, when the shielding member 122 is moved to directly below the camera hole 11c, the shielding member 122 is blocked between the camera 110 and the camera hole 11c, so as to block the path through which the external light passes to the camera 110. As shown in FIG. 2B and FIG. 3B, when the shielding member 122 moves out or moves away from the location directly below the camera hole 11c, the shielding member 122 moves out between the camera 110 and the camera hole 11c, so that the path through which the external light passes to the camera 110 is restored.

As shown in FIG. 2A and FIG. 2B, the casing 11 further has a sliding slot 11d located in the frame area 11b, and the sliding slot 11d is adjacent to the camera hole 11c. In addition, the sliding member 121 includes a switch protrusion 121a slidably disposed in the sliding groove 11d, and the sliding direction of the switch cover 120 is determined by the cooperation of the switching protrusion 121a and the sliding groove 11d. As shown in FIG. 3A and FIG. 3B, the switch protrusion 121a protrudes out of the casing 11 so that the user can toggle the switch cover 120 through the switch protrusion 121a. In addition, the shielding member 122 has a positioning hole 122a sleeved on the switch protrusion 121a, so as to improve the accuracy and reliability of the assembled and positioning, and prevent the shielding member 122 from detaching from the sliding member 121.

As shown in FIG. 2A and FIG. 3A, the casing 11 further has a positioning portion 11e located in the frame area 11b, such as a positioning protrusion or a positioning protrusion rib adjacent to the sliding slot 11d. The camera hole 11c and the positioning portion 11e are respectively located on opposite sides of the sliding slot 11d, the positioning portion 11e has a first positioning end 11f and a second positioning end 11g opposite to the first positioning end 11f, and the first positioning end 11f is closer to the sliding slot 11d than the second positioning end 11g.

As shown in FIG. 2A and FIG. 3A, the sliding member 121 further includes two positioning elastic arms 121b arranged side by side, which are slidably disposed on opposite sides of the positioning portion 11e. When the two positioning elastic arms 121b are leaned against the first positioning end 11f of the positioning portion 11e, the shielding member 122 is blocked between the camera 110 and the camera hole 11c. As shown in FIG. 2B and FIG. 3B, when the two positioning elastic arms 121b slide relative to the positioning portion 11e and lean against the second positioning end 11g, the shielding member 122 moves out between the camera 110 and the camera hole 11c.

As shown in FIG. 2A, each positioning elastic arm 121b has a wedging protrusion 121c and a guiding protrusion 121d opposite to the wedging protrusion 121c, and the two wedging protrusions 121c of the two positioning elastic arms 121b face toward the positioning portion 11e. As shown in FIG. 2A and FIG. 3A, when the two wedging protrusions 121c of the two positioning elastic arms 121b lean against the first positioning end 11f of the positioning portion 11e, the shielding member 122 is blocked between the camera 110 and the camera hole 11c. As shown in FIG. 2B and FIG. 3B, when the two wedging protrusions 121c of the two positioning elastic arms 121b slide toward the second positioning end 11g of the positioning portion 11e and lean against the second positioning end 11g, the shielding member 122 moves out between the camera 110 and the camera hole 11c.

As shown in FIG. 2A and FIG. 2B, the casing 11 further has two guide grooves 11h located on opposite sides of the two positioning elastic arms 121b, and the two guiding protrusions 121d of the two positioning elastic arms 121b are slidably connected to the two guide grooves 11h respectively to determine the sliding stroke and sliding direction of the switch cover 120.

To sum up, in the camera module and electronic device of the present disclosure, the switch cover adopts a manual switching mechanism. Accordingly, even if a person who deliberately steals private images invades the camera module and electronic device at the remote end, the person cannot control the switch cover, and the private image cannot be obtained through the camera covered by the switch cover. Therefore, the camera module and electronic device of the present disclosure have good information security protection.

On the other hand, the switch cover may be composed of a plastic member and a polyester film attached to the plastic member. Because the thickness of the polyester film is relatively thin, it is beneficial to maintain or reduce the thickness of the electronic device to meet the thinning design requirement. In addition, the width of the switch cover composed of the plastic member and the polyester film attached to the plastic member is relatively narrow, which is conducive to further reducing the width of the frame area of the casing to meet the design requirements of narrow bezel.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A camera module suited for assembled in a casing, the camera module comprises:
   a camera arranged in the casing and aligned with a camera hole of the casing; and
   a switch cover slidably arranged in the casing, wherein the switch cover includes a sliding member and a shielding member secured to the sliding member, and a thickness of the shielding member is less than a thickness of the sliding member,
   the camera hole is seated on a sliding path of the shielding member, and the shielding member is suited for blocking between the camera and the camera hole or moving out between the camera and the camera hole, the casing has a sliding slot adjacent to the camera hole and a positioning portion adjacent to the sliding slot, and the sliding member includes a switch protrusion slidably disposed in the sliding slot and two positioning elastic arms arranged side by side, the switch protrusion protrudes out from the casing, and the positioning portion has a first positioning end and a second positioning end opposite to the first positioning end, the two positioning elastic arms are suited for sliding on opposite sides of the positioning portion, and leaning against the first positioning end or the second positioning end.

2. The camera module according to claim 1, wherein the shielding member has a positioning hole sleeved on the switch protrusion.

3. The camera module according to claim 1, wherein the two positioning elastic arms both have a wedging protrusion and a guiding protrusion opposite to the wedging protrusion, and the two wedging protrusions of the two positioning elastic arms face toward the positioning portion, the two wedging protrusions lean against the first positioning end or the second positioning end, the casing further has two guide grooves located on opposite sides of the two positioning elastic arms, and the two guiding protrusions of the two positioning elastic arms respectively are slidably disposed on the two guide grooves.

4. The camera module according to claim 1, wherein the sliding member is a plastic member, and the shielding member is a polyester film attached to the sliding member.

5. An electronic device, comprising:

a casing having a display area, a frame area surrounding the display area, a camera hole located in the frame area, a sliding slot adjacent to the camera hole and located in the frame area, and a positioning portion adjacent to the sliding slot and located in the frame area;

a camera, disposed in the casing corresponding to the frame area, and aligned with the camera hole; and a switch cover slidably arranged in the casing corresponding to the frame area, wherein the switch cover includes a sliding member and a shielding member secured to the sliding member, and a thickness of the shielding member is less than a thickness of the sliding member, the camera hole is seated on a sliding path of the shielding member, and the shielding member is suited for blocking between the camera and the camera hole or moving out between the camera and the camera hole, the sliding member includes a switch protrusion slidably disposed in the sliding slot and two positioning elastic arms arranged side by side, and the switch protrusion protrudes out from the casing, the positioning portion has a first positioning end and a second positioning end opposite to the first positioning end, the two positioning elastic arms are suited for sliding on opposite sides of the positioning portion, and leaning against the first positioning end or the second positioning end.

6. The electronic device according to claim 5, wherein the shielding member has a positioning hole sleeved on the switch protrusion.

7. The electronic device according to claim 5, wherein the two positioning elastic arms both have a wedging protrusion and a guiding protrusion opposite to the wedging protrusion, and the two wedging protrusions of the two positioning elastic arms face toward the positioning portion, the two wedging protrusions lean against the first positioning end or the second positioning end, the casing further has two guide grooves located on opposite sides of the two positioning elastic arms, and the two guiding protrusions of the two positioning elastic arms respectively are slidably disposed on the two guide grooves.

8. The electronic device according to claim 5, wherein the sliding member is a plastic member, and the shielding member is a polyester film attached to the sliding member.

* * * * *